United States Patent
Vong

(10) Patent No.: US 10,722,078 B2
(45) Date of Patent: Jul. 28, 2020

(54) ROBOTIC COOKING DEVICE HAVING ROTATABLE AND TILTABLE ARMS THAT ENABLING TRANSFERENCE OF FOOD BETWEEN FOOD PROCESSING UNITS THAT ARE ATTACHED AT ENDS OF THE ARMS

(71) Applicant: Tony Kahn Vong, Sacramento, CA (US)

(72) Inventor: Tony Kahn Vong, Sacramento, CA (US)

( * ) Notice: Subject to any disclaimer, the term of this patent is extended or adjusted under 35 U.S.C. 154(b) by 323 days.

(21) Appl. No.: 15/919,225

(22) Filed: Mar. 13, 2018

(65) Prior Publication Data
US 2018/0199764 A1    Jul. 19, 2018

Related U.S. Application Data

(63) Continuation-in-part of application No. 14/461,365, filed on Aug. 16, 2014, now Pat. No. 9,955,823.

(51) Int. Cl.
*A47J 44/02* (2006.01)
*A47J 27/14* (2006.01)
*A47J 37/04* (2006.01)
*A47J 37/12* (2006.01)

(52) U.S. Cl.
CPC ............. *A47J 44/02* (2013.01); *A47J 37/047* (2013.01); *A47J 37/1228* (2013.01); *A47J 27/14* (2013.01)

(58) Field of Classification Search
CPC ....... A47J 27/12; A47J 44/00; B01F 13/1058; B01F 13/1072; B01F 7/16; B01F 9/00; B01F 9/0001; B01F 9/0032; B01F 11/00
USPC ........................................................... 99/326
See application file for complete search history.

(56) References Cited

U.S. PATENT DOCUMENTS

| | | | |
|---|---|---|---|
| 4,585,148 A * | 4/1986 | Ito ....................... | B01F 13/1058 222/77 |
| 5,046,914 A * | 9/1991 | Holland ................... | B25J 5/007 414/680 |
| 5,421,318 A * | 6/1995 | Unruh .................... | A47J 37/042 126/25 A |
| 5,740,572 A * | 4/1998 | Hannant ............ | A61G 13/1245 5/624 |
| 2005/0193901 A1* | 9/2005 | Buehler ................... | A47J 44/00 99/468 |
| 2013/0074700 A1* | 3/2013 | Cheung .................... | A47J 36/06 99/348 |

* cited by examiner

*Primary Examiner* — Serkan Akar
*Assistant Examiner* — Spencer H. Kirkwood
(74) *Attorney, Agent, or Firm* — Chen-Chi Lin

(57) ABSTRACT

A food processing system has a wheel-shaped assembly having a stationary sub-assembly and a movable sub-assembly. The movable sub-assembly has three or more arms extending away from the stationary sub-assembly; three or more connecting rods; three or more pivoters; three or more rotators; and three or more food processing devices. The three or more food processing devices comprise a plurality of cooking chambers and a plurality of blenders. The three or more arms are rotatable about a first direction. A horizontal diameter of each connecting rod stays in a respective horizontal position parallel to a second direction perpendicular to the first direction during rotation of the respective arm about the first direction.

6 Claims, 13 Drawing Sheets

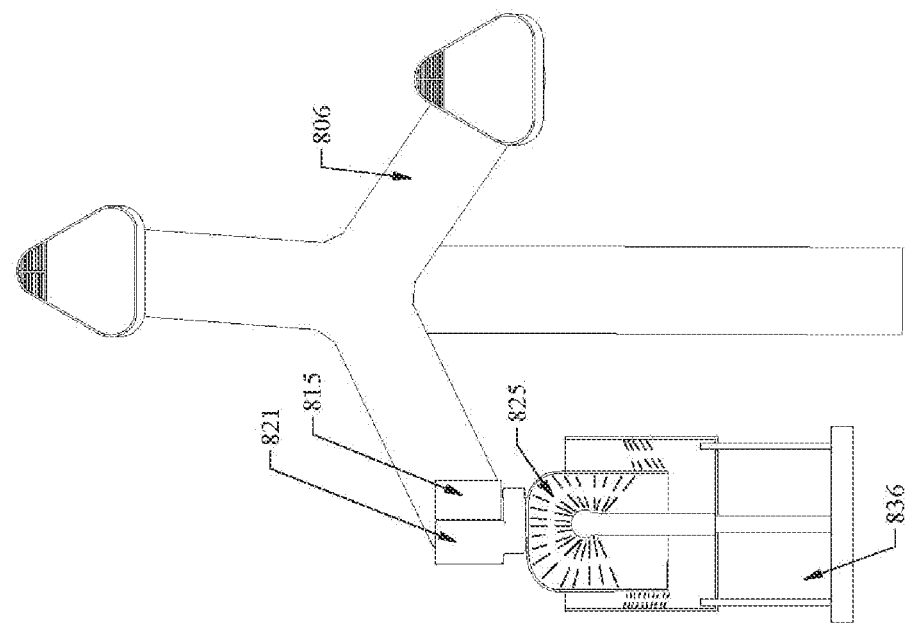
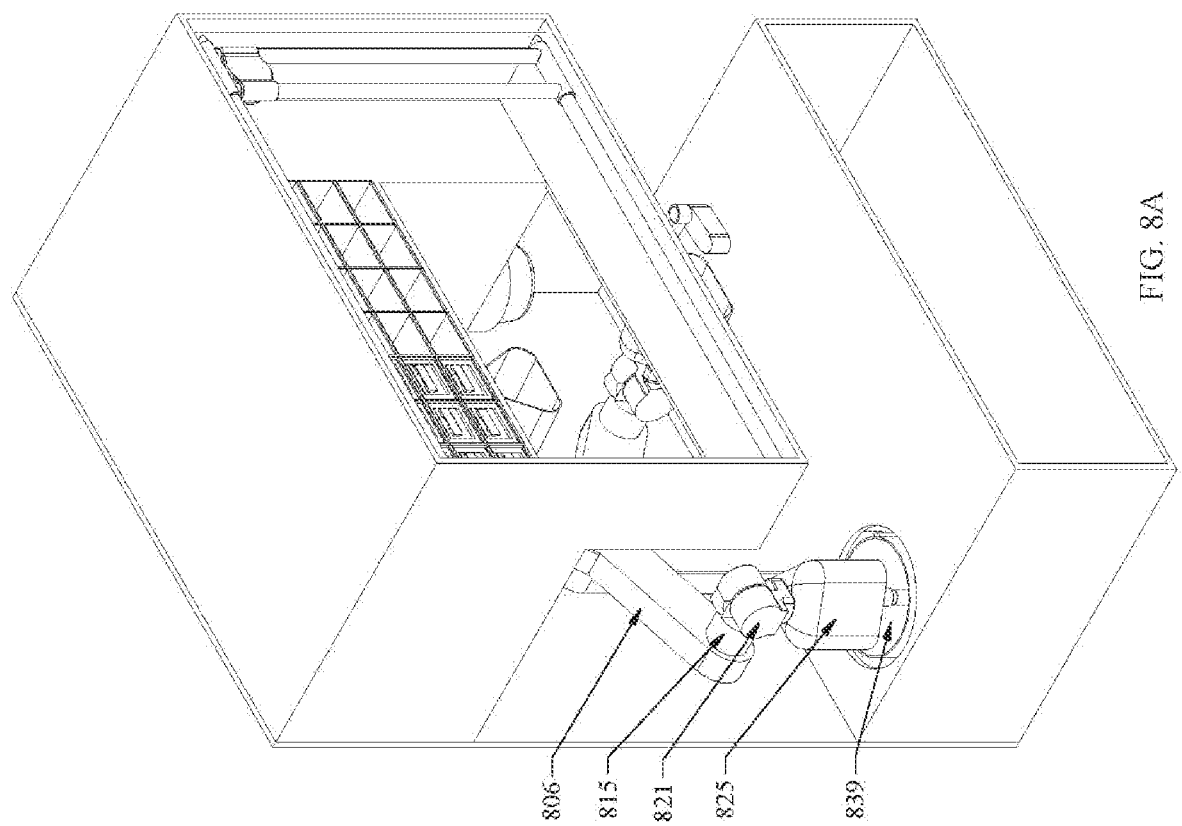
FIG. 8B
FIG. 8A

ROBOTIC COOKING DEVICE HAVING ROTATABLE AND TILTABLE ARMS THAT ENABLING TRANSFERENCE OF FOOD BETWEEN FOOD PROCESSING UNITS THAT ARE ATTACHED AT ENDS OF THE ARMS

CROSS-REFERENCE TO RELATED APPLICATIONS

This Patent Application is a Continuation-in-part Application of a pending application Ser. No. 14/461,365 filed on Aug. 16, 2014. The Disclosure made in the patent application Ser. No. 14/461,365 is hereby incorporated by reference.

FIELD OF THE INVENTION

This invention relates generally to a food processing system. More particularly, the present invention relates to a food processing system having cooking chambers and blenders.

BACKGROUND OF THE INVENTION

An advantage of the present disclosure is to provide an operator cooked food whenever the operator wants it. Business owners, vending machine operators, and individuals can install food processing systems of the present disclosure in their offices or homes to get freshly cooked food 24 hours a day.

A food processing system may be an autonomous chef. A cook may spend less time in preparing food and in cooking the food. A computer controlled cooking temperature and cooking period are more accurate.

SUMMARY OF THE INVENTION

A food processing system has a wheel-shaped assembly having a stationary sub-assembly and a movable sub-assembly. The movable sub-assembly has three or more arms extending away from the stationary sub-assembly; three or more connecting rods; three or more pivoters; three or more rotators; and three or more food processing devices. The three or more food processing devices comprise a plurality of cooking chambers and a plurality of blenders. The three or more arms are rotatable about a first direction. A horizontal diameter of each connecting rod stays in a respective horizontal position parallel to a second direction perpendicular to the first direction during rotation of the respective arm about the first direction.

The food processing system when integrated with a food feeding, food placing, and cleaning device will become a fully automated robotic system. A user instructs the computer what the user wants. The computer selects the correct food container and empties it in the cooking chamber. The computer applies the appropriate amount of heat and duration to the heating elements. The computer rotates/flips the cooking chamber for sufficient time to cook the food. When the food is cooked, the arm rotates the cooking chamber above the bowl. The pivoter pivots the cooking chamber downward to empty cooked food onto the bowl. The arm then moves the cooking chamber above the washer device. The pivoter pivots the cooking chamber downward and the washer device moves upward. The cooking chamber rotates/spins while the washer sprays high pressurized cleaning solution in and outside the cooking chamber. The cooking chamber is now cleaned and ready to receive the next order.

BRIEF DESCRIPTION OF THE DRAWINGS

FIG. 8A is a perspective view of the food processing system with the cooking chamber pivoted downward toward the washer device.

FIG. 8B is a front partial section view of the washer device cleaning the cooking chamber in examples of the present disclosure.

DETAILED DESCRIPTION OF THE INVENTION

Figure 1:
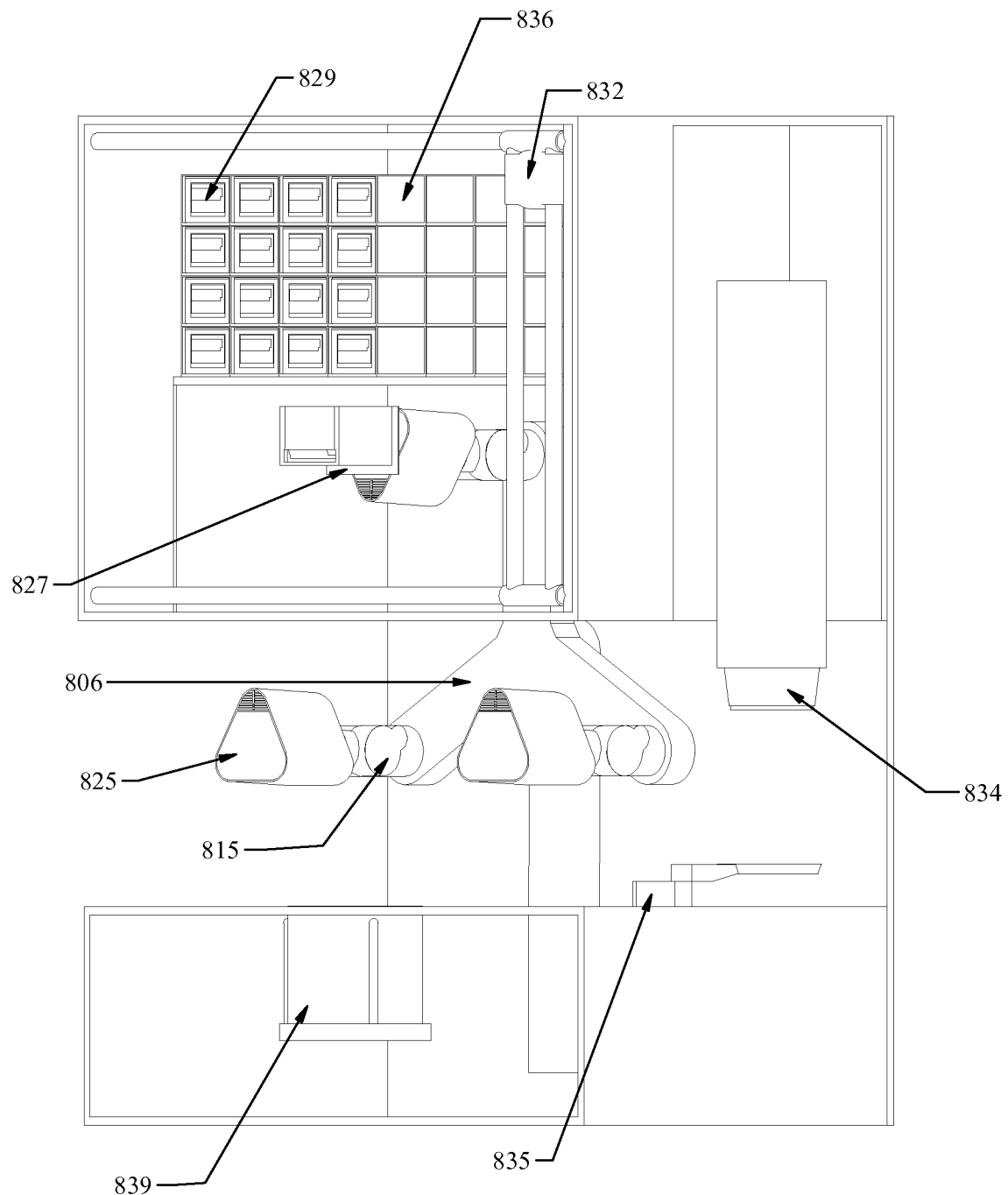
FIG. 1 is a perspective view of a food processing system in examples of the present disclosure.

FIG. 1 shows one aspect of the autonomous chef. In examples of the present disclosure, the food processing system is of a ferris wheel-shaped assembly. The food processing system includes a material feeding device 832, a cooked food holding device 835, a washer device 839, and three cooking chambers 825 attached to three rotating arms 806. Food is prepared and stored in a food container 829 which is placed in a storage shelf 836.

Figure 2A:
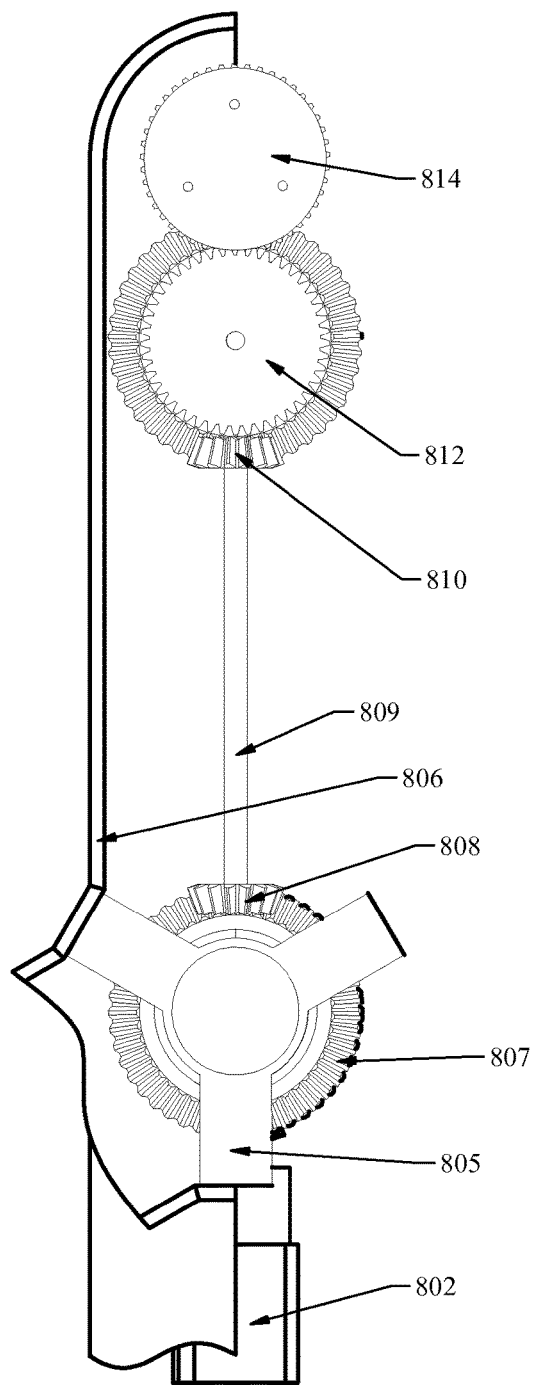
FIGS. 2A-B are front/left partial section views of the arm and base showing how it keeps the cooking chambers in a horizontal orientation when the arm rotates at a predetermined angle.
Figure 2B:
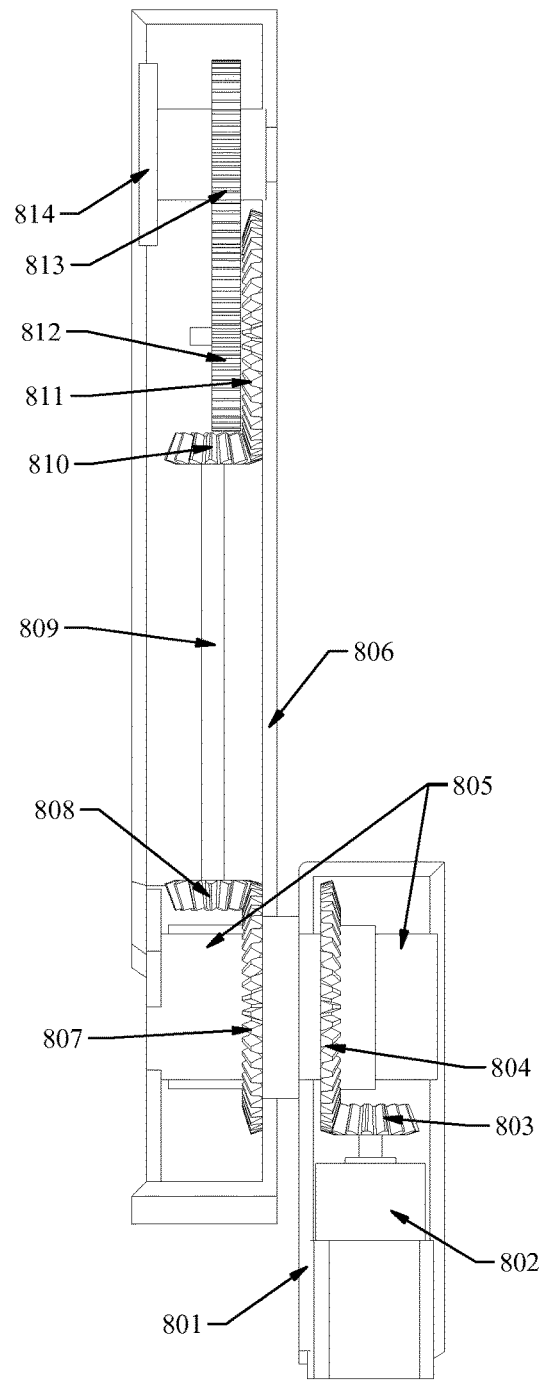

FIGS. 2A-B show how the cooking chambers stay horizontal. Located in a base 801, a motor 802 drives a bevel gear 803, a bevel gear 804 and causes an arm rod 805 to rotate an arm 806. A bevel gear 807 is stationary. As the arm 806 rotates, it causes a bevel gear 808 to rotate. When the bevel gear 808 rotates, it also rotates a rod 809, a bevel gear 810 and a bevel gear 811. The bevel gear 811 is attached to a spur gear 812. When the spur gear 812 rotates, it rotates a spur gear 813. A connecting rod 814 is attached to the spur gear 813. Under the rotation of the arm rod 805, the connecting rod 814 is maintained in a horizontal position. In examples of the present disclosure, the connecting rod 814 connects the arm 806 to the pivoter 815 (See the arm 806, the spur gear 813, the connecting rod 814 of FIG. 2B and the spur gear 813, the connecting rod 814 and the pivoter 815 of FIG. 3A). In examples of the present disclosure, the connecting rod 814 is between the arm 806 and the pivoter 815. In examples of the present disclosure, an entirety of the connecting rod 814 is between the arm 806 and the pivoter 815.

In examples of the present disclosure, the first bevel gear 808 is directly contacting and engaged with the first rod 809. The first rod 809 is directly contacting and engaged with the second bevel gear 810. The second bevel gear 810 is directly contacting and engaged with the third bevel gear 811. The third bevel gear 811 is directly contacting and engaged with the first spur gear 812. The first spur gear 812 is directly contacting and engaged with the second spur gear 813. The connecting rod 814 is directly contacting and engaged with the second respective spur gear 813. In examples of the present disclosure, the first bevel gear 808 is directly contacting and engaged with a stationary bevel gear 807 of a stationary sub-assembly.

Figure 3C:
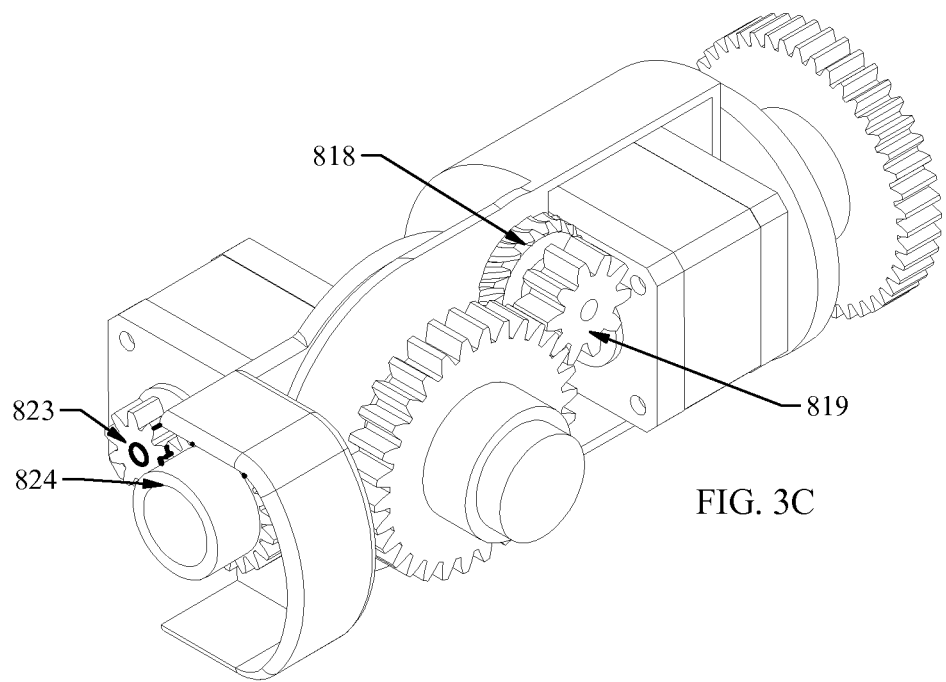
FIG. 3C is a perspective partial view of FIG. 3A-B.
Figure 3B:
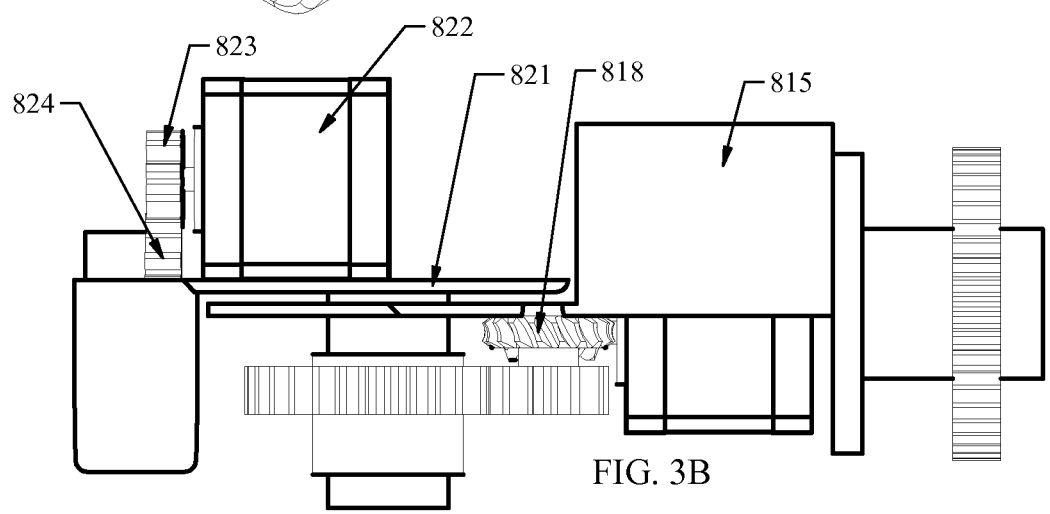
FIGS. 3A-B are left/top partial section views of an arm and a pivotal housing showing how the cooking chamber rotates, moves upward, and downward.
Figure 3A:
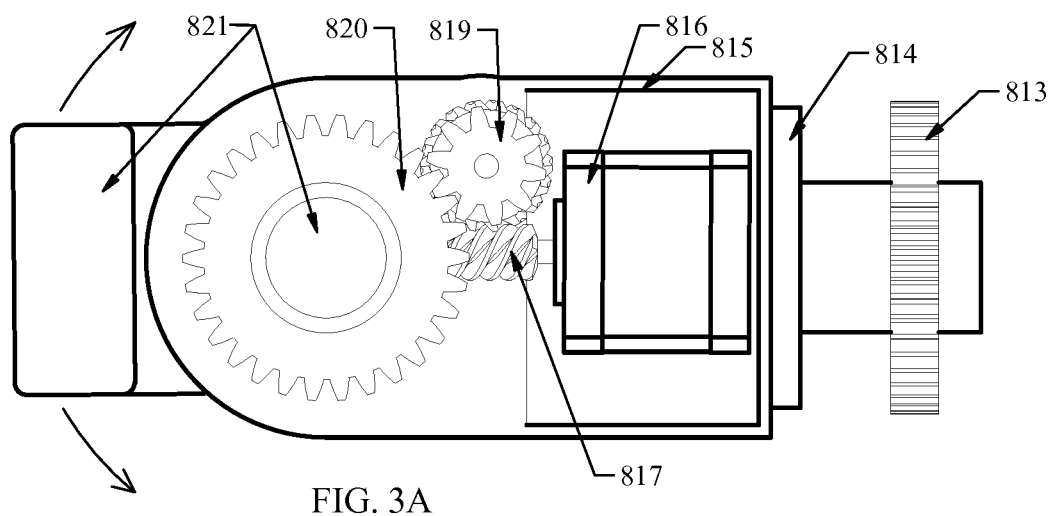

FIGS. 3A-C show how the cooking chamber pivots and rotates. A pivoter 815 is attached to the connecting rod 814. A motor 816 drives a worm gear 817 and a worm gear 818. A spur gear 819 is connected to the worm gear 818. The spur gear 819 causes a spur gear 820 to rotate. A rotator 821 is attached to the spur gear 820. So, when the motor 816 rotates clockwise or counter-clockwise, it causes the cooking chamber to pivot up or down.

A motor 822 drives a spur gear 823 and a spur gear 824. The spur gear 824 has a rod connecting to it. The cooking chamber is connected to the rod. When the motor 822 rotates, it causes the cooking chamber to spin, flip, or rotate.

Figure 4C:
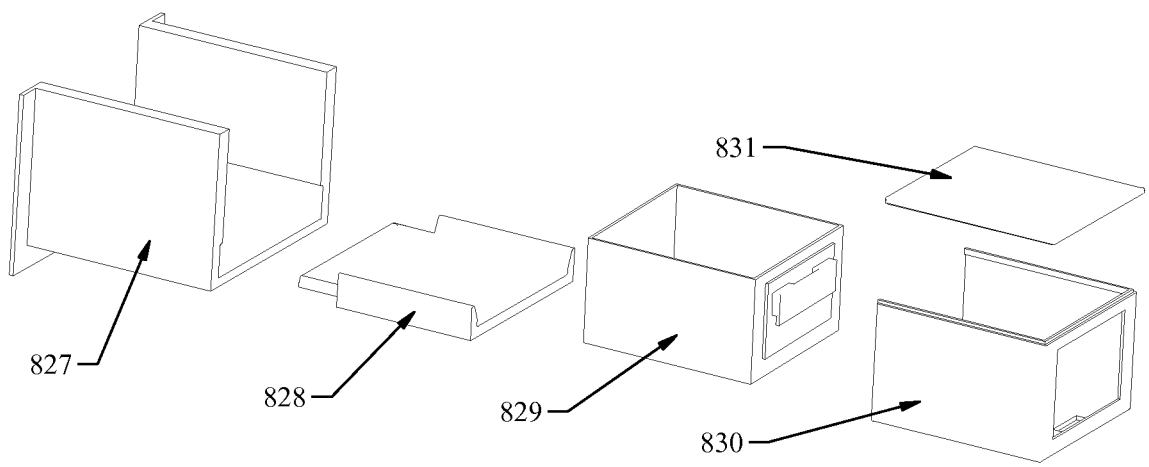
FIG. 4C is an exploded plot of a food container and a dispenser track.
Figure 4B:
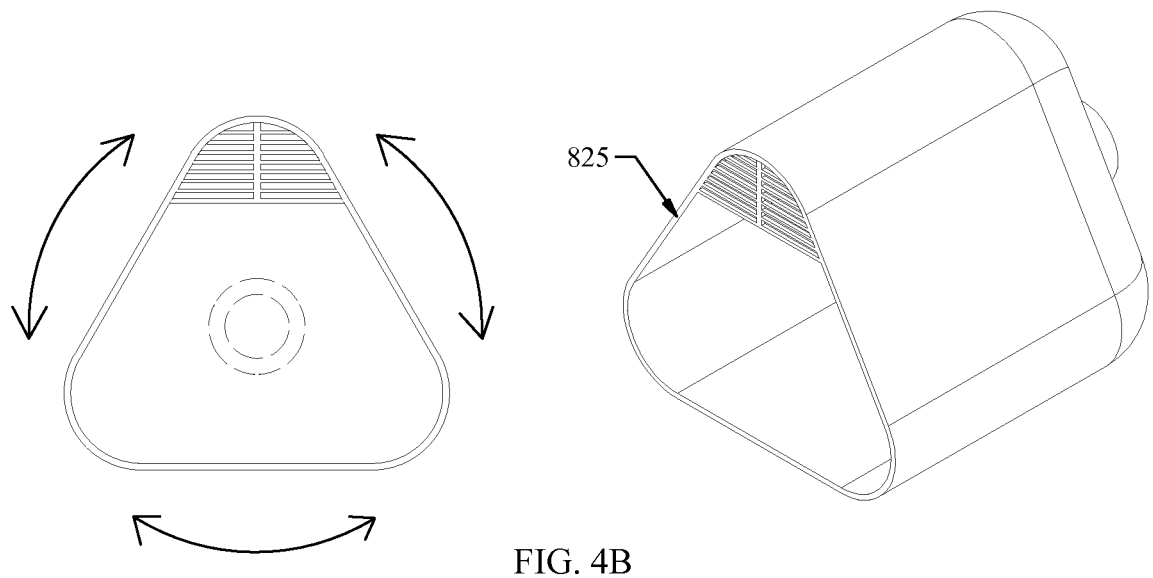
FIGS. 4A-B show different types of cooking chambers that can be used in the present disclosure.
Figure 4A:
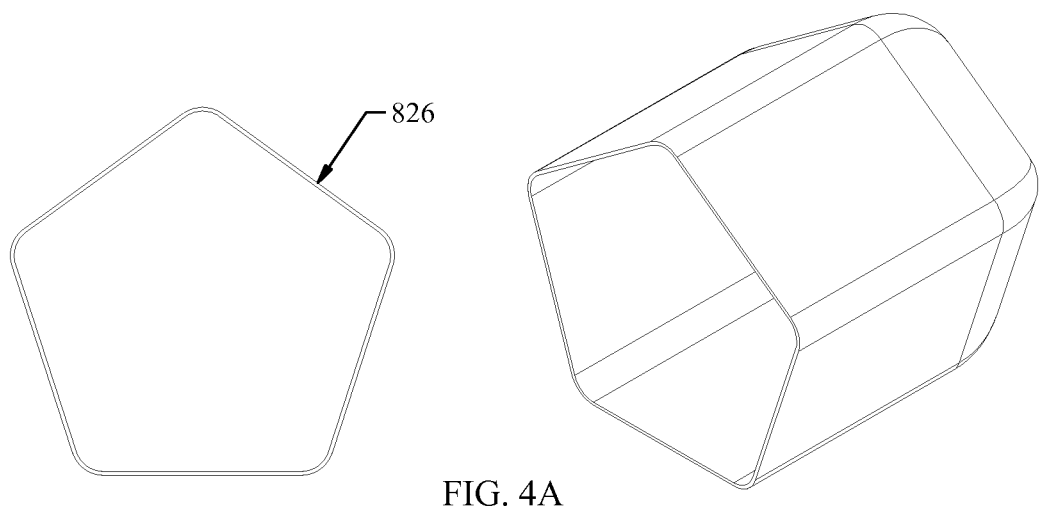

FIGS. 4A-B show different variations of cooking chambers. In examples of the present disclosure, all the cooking chambers have heating elements embedded in it. A cooking chamber 825 has a strainer built in it. The strainer is used to strain out liquid like oil. A cooking chamber 826 does not have a strainer and is good for stir-fry cooking. Though only two examples are illustrated, a person of ordinary skill in the art will recognizes that there are additional variations of the cooking chambers.

FIG. 4C shows how the food is stored and is emptied into the cooking chambers. The food is put in a food sliding container 829, which is stored inside a food sliding container housing 830. A food sliding container housing cap 831 covers the food. A food container sliding track 828 slides into a sliding track guide 827. This is how food material is emptied into the cooking chambers.

Figure 5B:
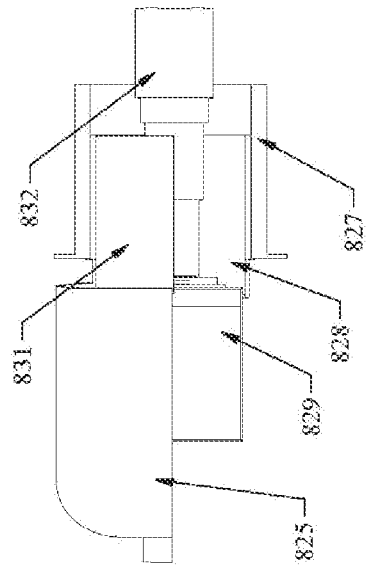
FIGS. 5B-C are left/top partial section views of the food container inside the cooking chamber.
Figure 5C:
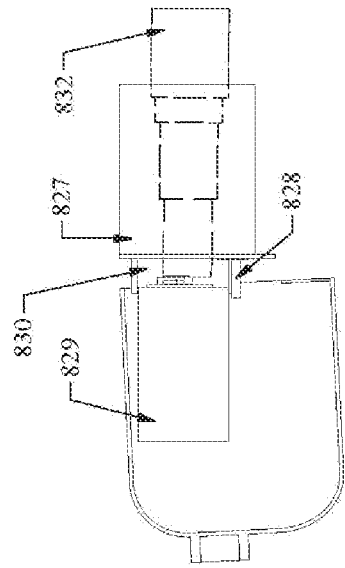
Figure 5A:
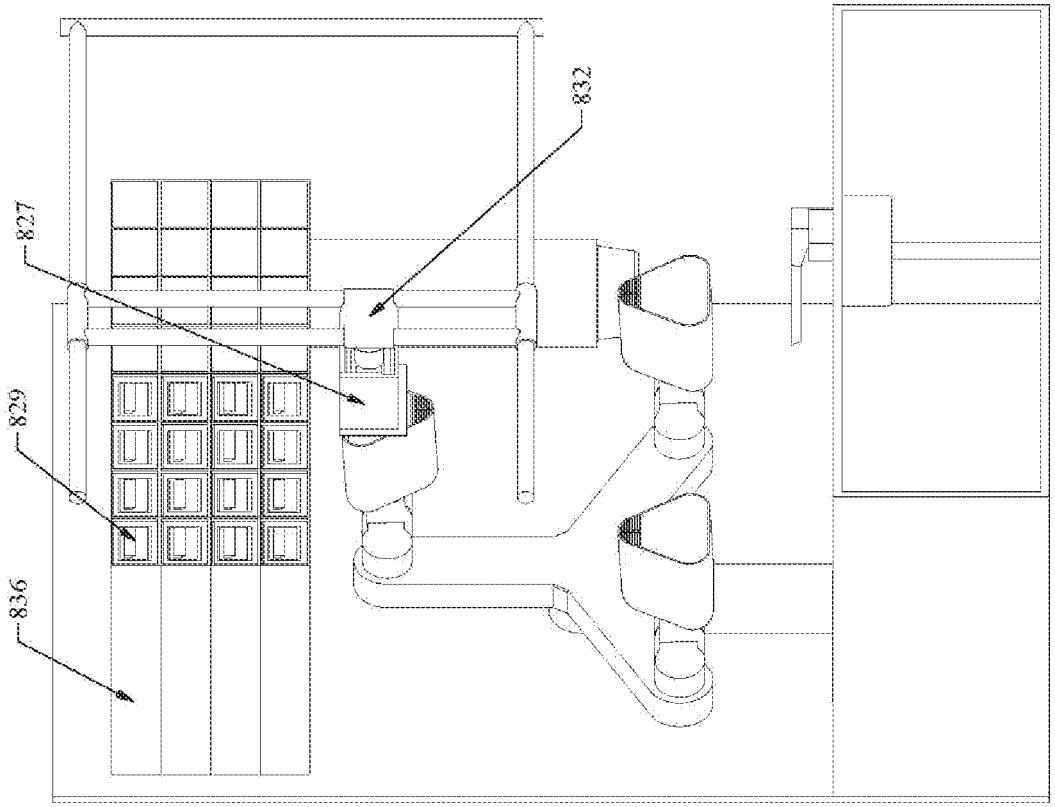
FIG. 5A is a perspective view of the food processing system with the material feeding device emptying content into the cooking chamber.

FIGS. 5A-C show how the food material is emptied into the cooking chamber 825. After the consumer selects the food the consumer wants, the material feeding device 832 pulls the selected food sliding container 829 from the food storage shelf 836. The food material is emptied into the cooking chamber 825 when the material feeding device 832 pushes the food sliding container 829 through the food sliding container housing 830 and the sliding track guide 827.

Figure 6:
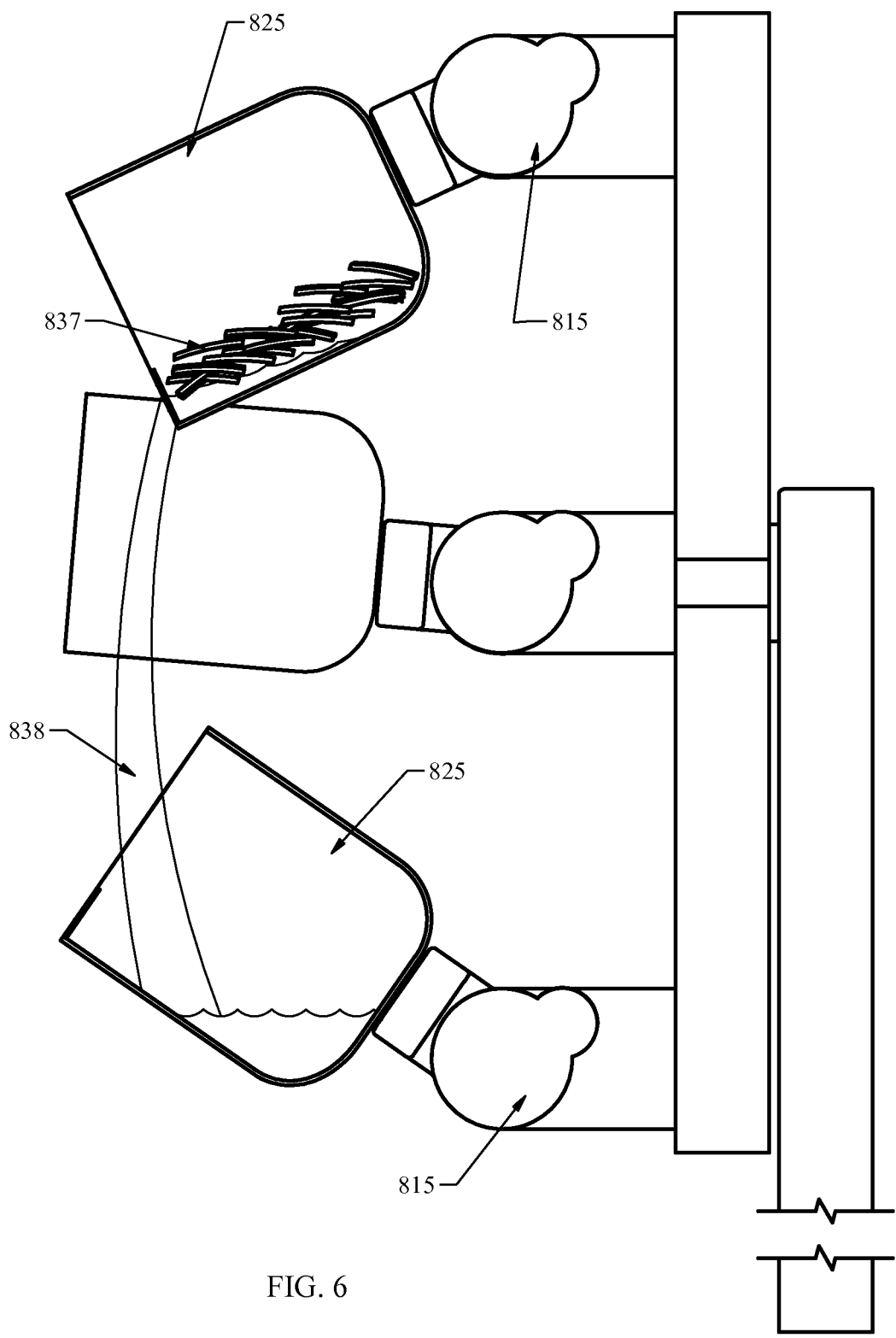
FIG. 6 is a left partial section view of a top cooking chamber transferring oil to a lower cooking chamber while the strainer holds back the French fries.

FIG. 6 shows how oil is strained from a first selected cooking chamber 825 to a second selected cooking chamber. The pivoter 815 pivots the first selected cooking chamber 825 up and pivots the second selected cooking chamber down. Oil 838 is strained from the first selected cooking chamber 825 to the second selected cooking chamber, leaving the French fries 837 in the first selected cooking chamber 825.

Figure 7B:
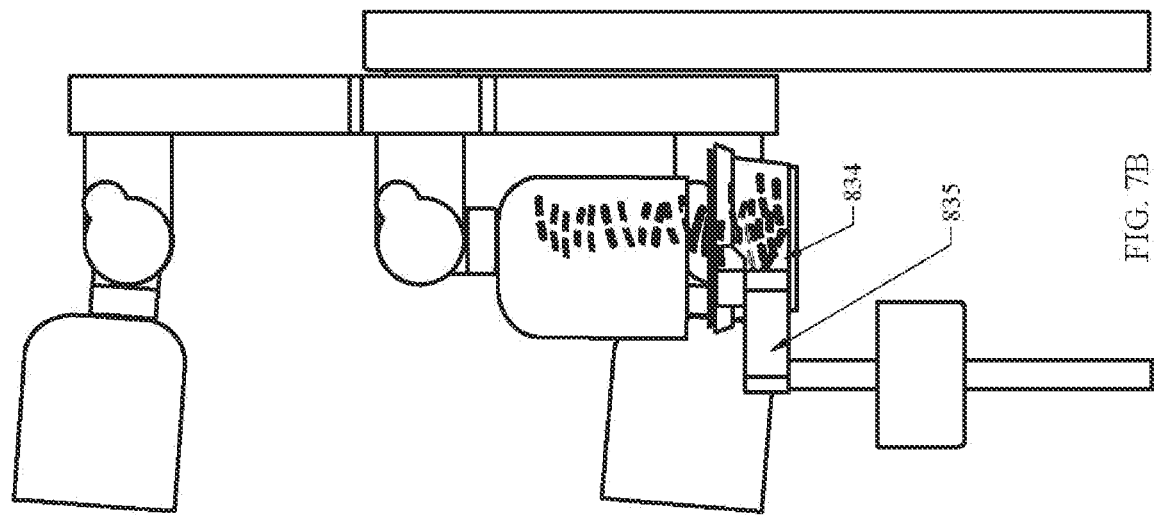
FIG. 7B is a left partial section view of FIG. 7A.
Figure 7A:
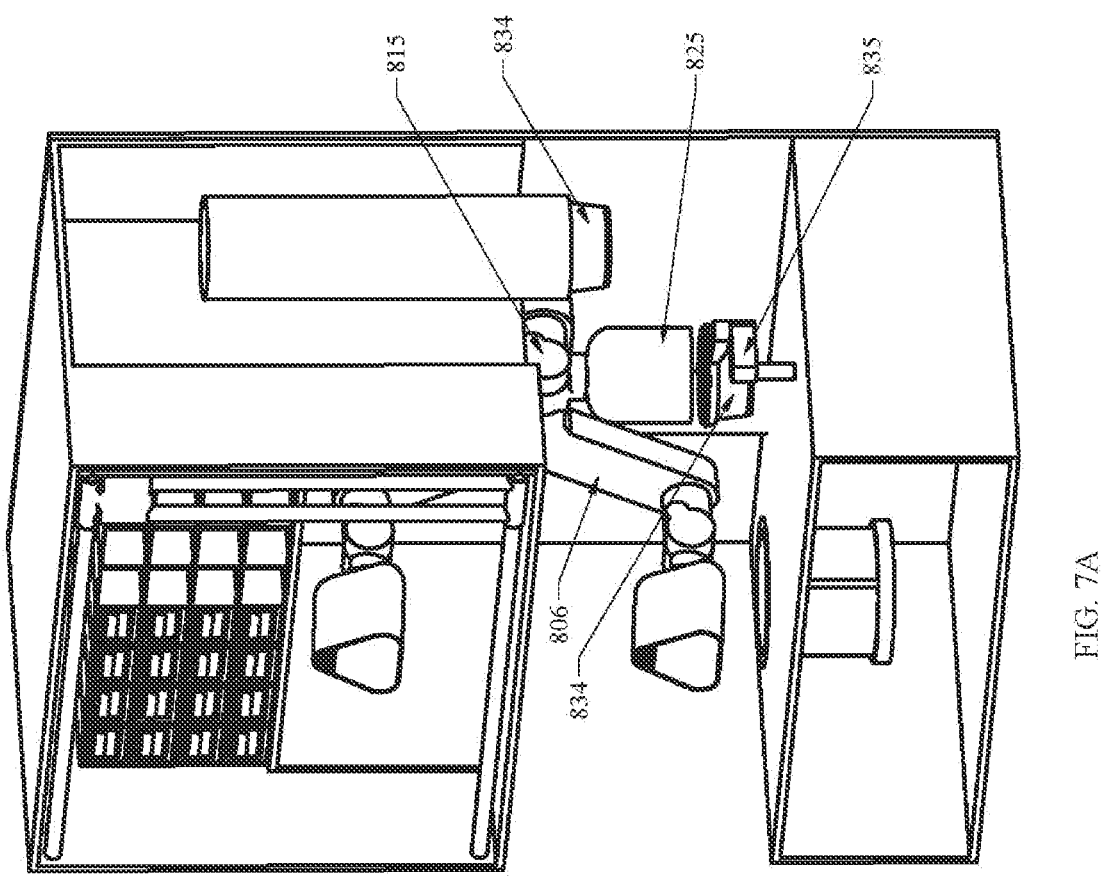
FIG. 7A is a perspective view of a food processing system with a cooking chamber emptying cooked content into a bowl.

FIGS. 7A-B show how the cooked food is emptied into a bowl 834. After the food is cooked, the arm 806 rotates the cooking chamber 825 to a position above the cooked food holding device 835. The pivoter 815 pivots the cooking chamber 825 downward to empty the content into the bowl 834. Note that the other two cooking chambers stay horizontally.

FIGS. 8A-B show how the cooking chamber 825 is cleaned. After the cooked food is emptied, arm 806 rotates the cooking chamber to a position above the washer device 839. The pivoter 815 pivots the cooking chamber 825 downward while the washer device 839 moves upward. As a rotator 821 spins the cooking chamber 825, the washer device 839 sprays a high pressure water jet with cleaning solution to interior and exterior of the cooking chamber 825.

Figure 9:
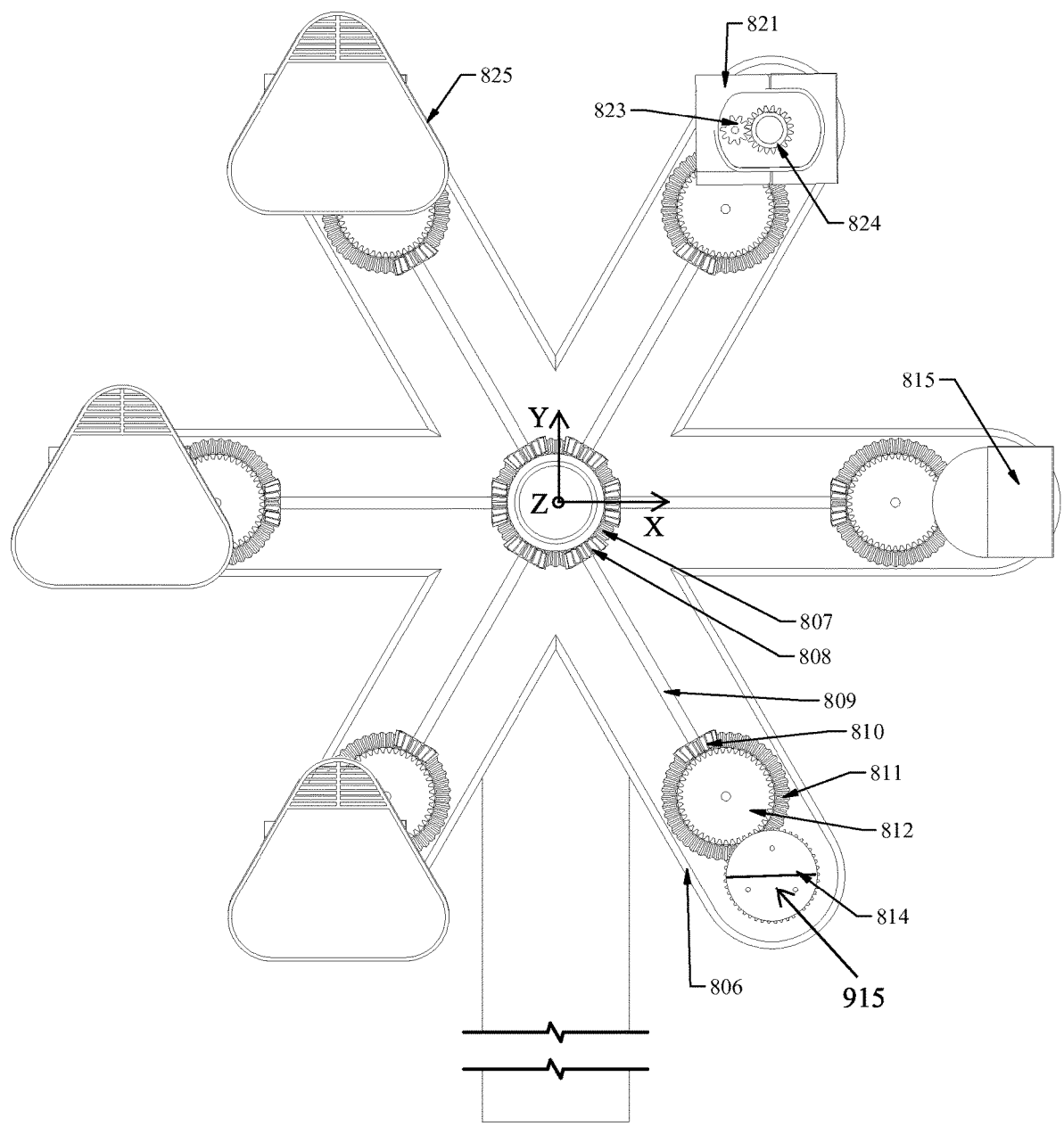
FIG. 9 is a front partial section view of the food processing system with six cooking chambers in examples of the present disclosure.

FIG. 9 shows the food processing system with six cooking chambers in examples of the present disclosure. FIG. 1 shows only three cooking chambers. By just adding three more arm 806 and using the same bevel gear 807, we can achieve a total of six cooking chambers that act as independently as the case with only three arms and three cooking chambers. The cooking chambers may be replaced by blenders (for example, see FIGS. 10 and 12). In examples of the present disclosure, the arm 806 is rotatable about Z-axis. Under the rotation of the arm rod 805, a horizontal diameter 915 of the connecting rod 814 is maintained in a horizontal position parallel to X-axis. In examples of the present disclosure, at a predetermined rotation angle of the arm 806, a first pivoter 815 and a second pivoter 815 are aligned along Y-axis (See FIG. 6).

Figure 10B:
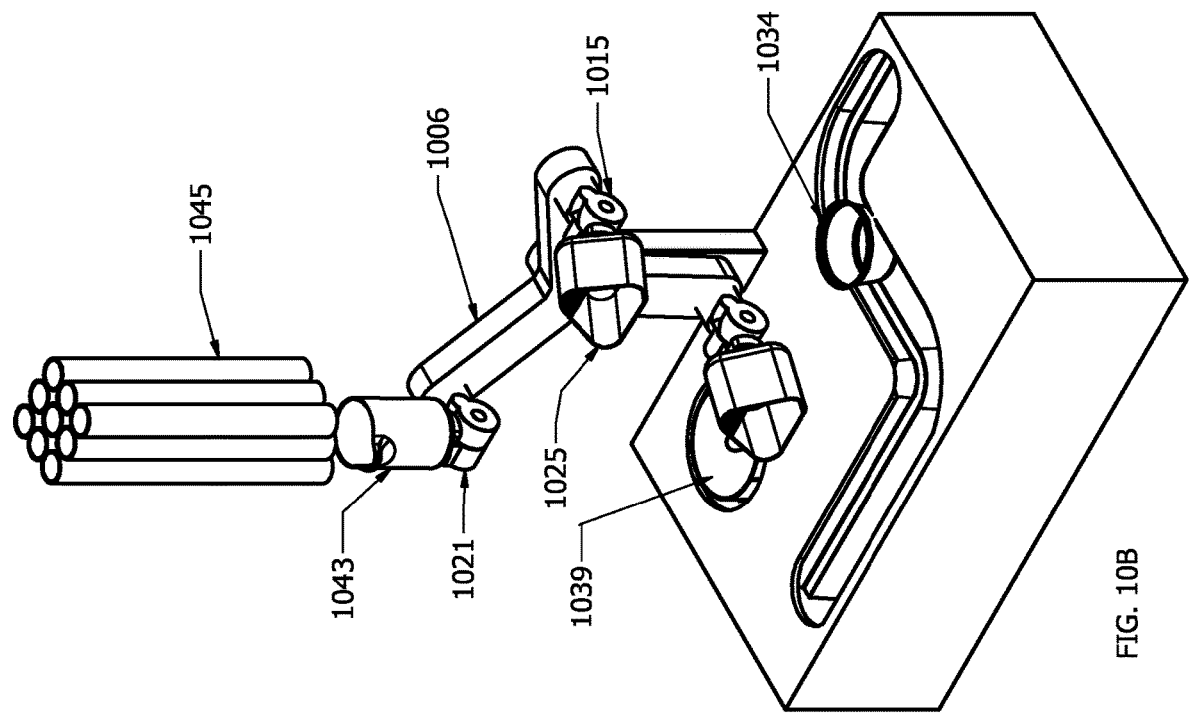
FIG. 10A is a front view and FIG. 10B is a perspective view of a food processing system having cooking chambers and blenders in examples of the present disclosure.
Figure 10A:
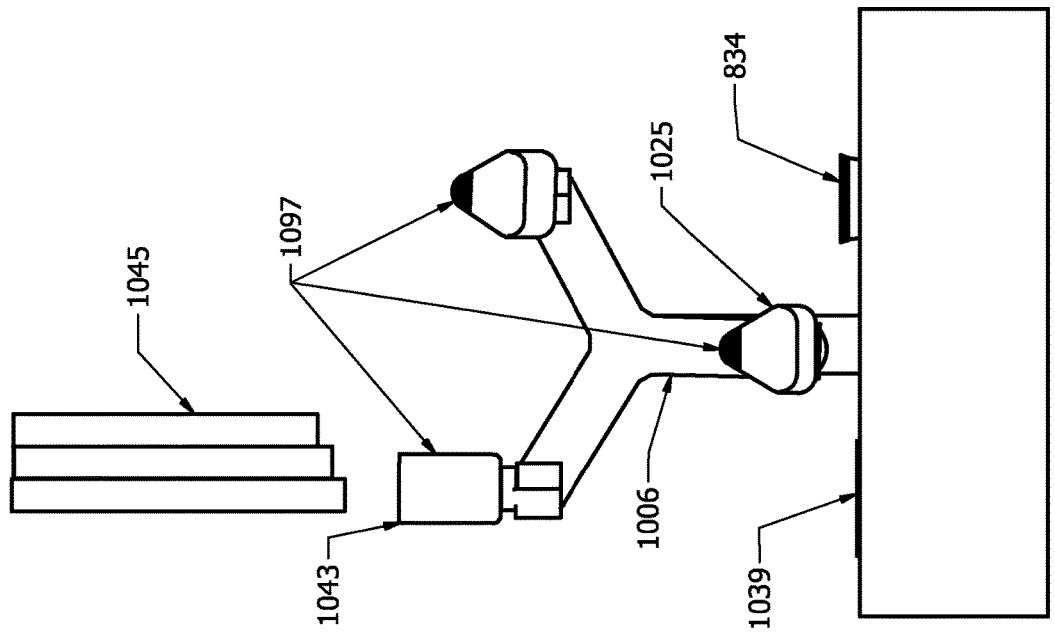

FIG. 10A is a front view and FIG. 10B is a perspective view of a food processing system having cooking chambers and blenders in examples of the present disclosure. Though three arms are shown in FIGS. 10A and 10B, the number of arms may be different. It may have three or more arms. It may have three or more food processing devices 1097. The food processing device 1097 may be a cooking chamber 1025 or a blender 1043. Though two cooking chambers and one blender are shown in FIGS. 10A and 10B, the number of cooking chambers and the number of blenders may be different. In one example, it may be three cooking chambers. In another example, it may be two blenders and one cooking chamber. In examples of the present disclosure, a first cooking chamber 1025 is attached to a first rotator 1021. The first rotator 1021 is attached to a first pivoter 1015. The first pivoter 1015 is attached to a first arm 1006. A second cooking chamber 1025 is attached to a second rotator 1021. The second rotator 1021 is attached to a second pivoter 1015. The second pivoter 1015 is attached to a second arm 1006. A blender 1043 is attached to a third rotator 1021. The third rotator 1021 is attached to a third pivoter 1015. The third pivoter 1015 is attached to a third arm 1006. The blender 1043 receives food from feeder 1045 when the blender 1043 is aligned with an exit of the feeder 1045. A bowl 1034 is configured to receive cooked food from the cooking chamber 1025. A washing device 1039 is configured to wash the cooking chamber 1025 or the blender 1043.

Figure 11:
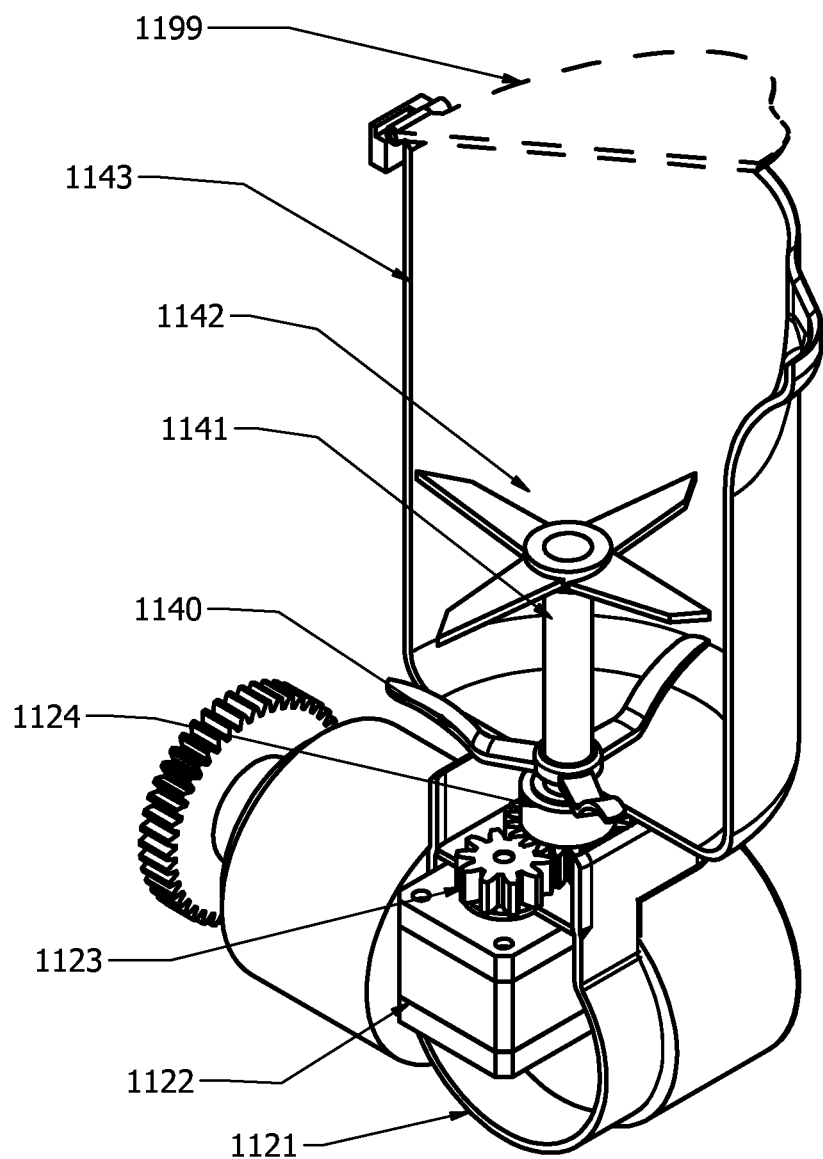
FIG. 11 is a partial perspective view of a blender in examples of the present disclosure.

FIG. 11 is a partial perspective view of a blender in examples of the present disclosure. The blender connects to a rotator housing 1121. The blender has a blender housing 1143 and an optional cover 1199 (shown in dashed lines).

The rotator housing 1121 is attached to the blender housing 1143. A spur gear 1124 is connected to a blender blade rod 1141. A blender top blade assembly 1142 and a blender lower blade assembly 1140 are attached to the blender blade rod 1141. A motor 1122 located in the rotator housing 1121 drives the blender top blade assembly 1142 and the blender lower blade assembly 1140 through a gear 1123, the spur gear 1124 and the blender blade rod 1141. In examples of the present disclosure, the blender housing 1143 is to receive food from the food container 829 in the storage shelf 836 driven by the material feeding device 832 of FIG. 1. The received food is blended in the blender housing 1143 by the blender top blade assembly 1142 and the blender lower blade assembly 1140.

Figure 12:
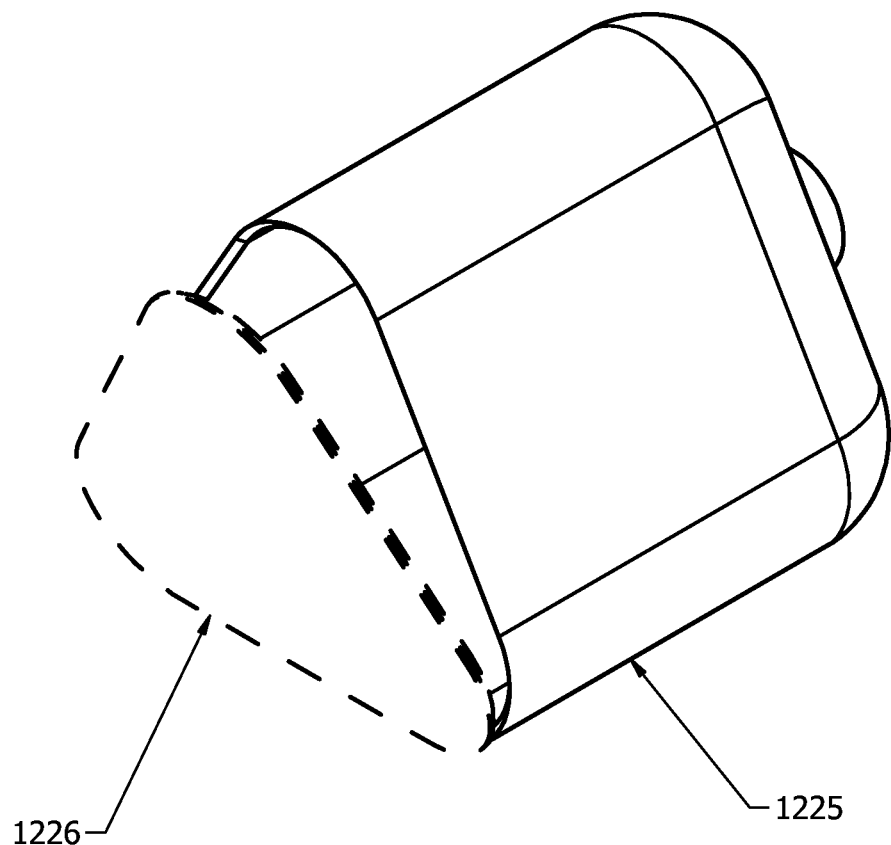
FIG. 12 is a perspective view of a cooking chamber in examples of the present disclosure.

FIG. 12 is a perspective view of a cooking chamber 1225 in examples of the present disclosure. The cooking chamber 1225 has an optional housing 1226 (shown in dashed lines).

Figure 13:
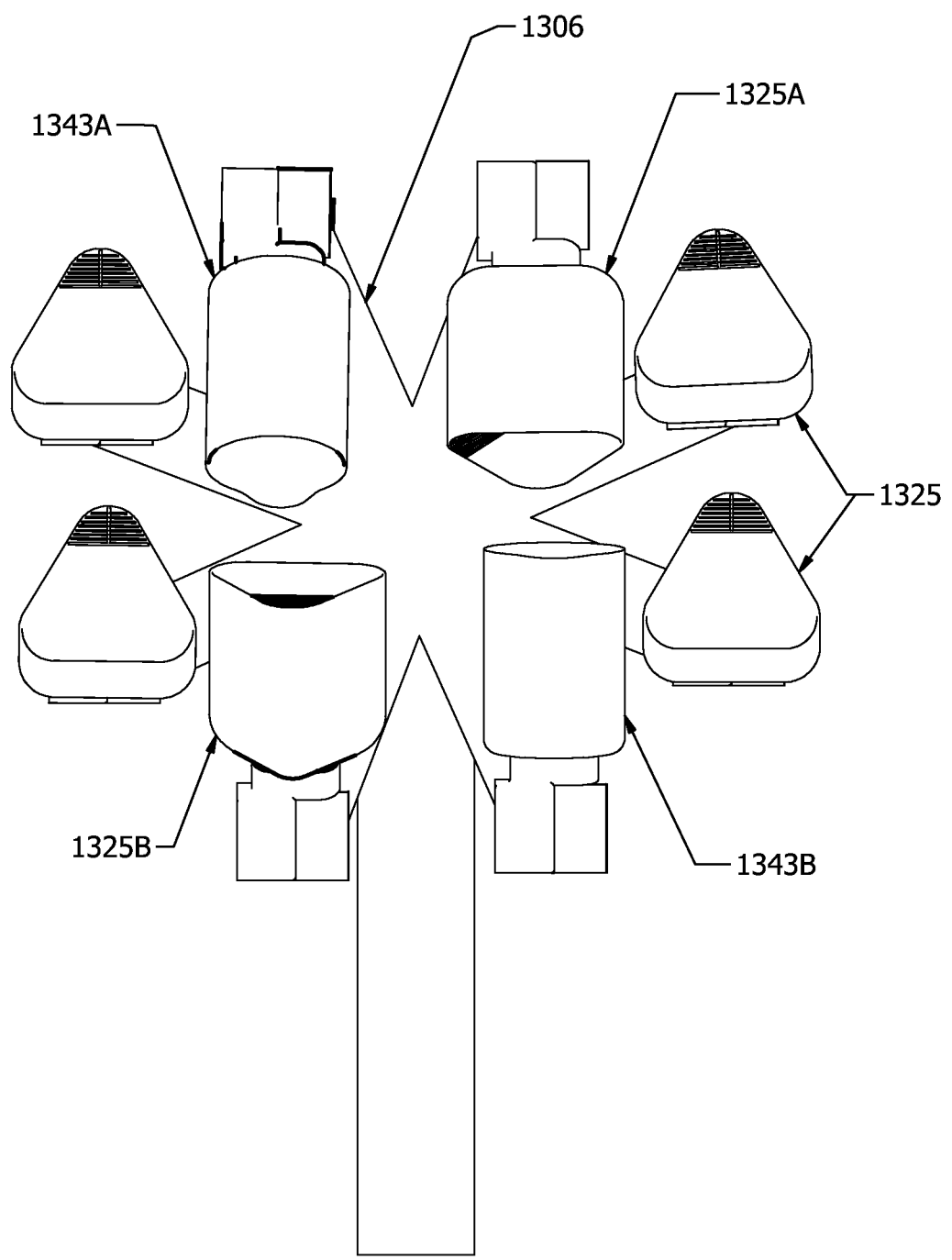
FIG. 13 is a front view of another food processing system having cooking chambers and blenders in examples of the present disclosure.

FIG. 13 is a front view of another food processing system having cooking chambers and blenders in examples of the present disclosure. The arms 1306 rotate about Z-axis. Though eight arms are shown in FIG. 13, the number of arms may be different. It may have three or more arms. It may have three or more food processing devices 1397. The food processing device 1397 may be a cooking chamber 1325 or a blender 1343A. In examples of the present disclosure, food material is transferred from the first cooking chamber 1325A to the first blender 1343B (the first cooking chamber 1325A is above the first blender 1343B) when the first cooking chamber 1325A and the first blender 1343B are aligned along Y-axis and the first cooking chamber 1325A and the first blender 1343B pivot to a first and second pre-determined angles with respect to the X-axis respectively. In examples of the present disclosure, another food material is transferred from the second blender 1343A to the second cooking chamber 1325B (the second blender 1343A is above the second cooking chamber 1325B) when the second blender 1343A and the second cooking chamber 1325B are aligned along Y-axis and the second blender 1343A the second cooking chamber 1325B pivot to a second and second pre-determined angles with respect to the X-axis respectively.

Those of ordinary skill in the art may recognize that modifications of the embodiments disclosed herein are possible. For example, a number of the cooking chambers may vary. A number of the blenders may vary. A number of the arms may vary. Other modifications may occur to those of ordinary skill in this art, and all such modifications are deemed to fall within the purview of the present invention, as defined by the claims.

The invention claimed is:

1. A food processing system comprising:
a wheel-shaped assembly comprising:
a stationary sub-assembly; and
a movable sub-assembly comprising:
three or more arms extending away from the stationary sub-assembly, the three or more arms rotatable about a first direction;
three or more connecting rods;
three or more pivoters;
three or more rotators; and
three or more food processing devices;
each food processing device being attached to a respective rotator;
each rotator being attached to a respective pivoter;
each connecting rod connecting a respective pivoter to a respective arm;
wherein each connecting rod is between a respective arm and a respective pivoter;
wherein a horizontal diameter of each connecting rod stays in a respective horizontal position parallel to a second direction perpendicular to the first direction during rotation of the respective arm about the first direction;
wherein the three or more food processing devices comprises
a first cooking chamber; and
a first blender; and
wherein food material is transferred from the first cooking chamber to the first blender when the first cooking chamber and the first blender are aligned along a third direction perpendicular to the first and second directions and the first cooking chamber and the first blender pivot to a first and second pre-determined angles with respect to the second direction respectively.

2. The food processing system of claim 1, wherein the three or more food processing devices have four or more food processing devices and the three or more food processing devices further comprises
a second cooking chamber; and
a second blender.

3. The food processing system of claim 2, wherein another food material is transferred from the second blender to the second cooking chamber when the second blender and the second cooking chamber are aligned along the third direction and the second blender and the second cooking chamber pivot to a third and fourth pre-determined angles with respect to the second direction respectively.

4. The food processing system of claim 3, wherein the first cooking chamber has a heating element and wherein the second cooking chamber has a strainer.

5. The food processing system of claim 3, wherein the first blender comprises a blender housing;
a blender rod;
a top blade assembly attached to the blender rod; and
a lower blade assembly attached to the blender rod;
wherein a motor drives the top blade assembly and the lower blade assembly.

6. The food processing system of claim 3, wherein the first blender further comprises
a cover configured to cover the blender housing and wherein the first cooking chamber comprises a cooking chamber cover.

* * * * *